Nov. 29, 1932.  H. HANSEN  1,889,461

KEY CUTTING APPARATUS

Original Filed March 27, 1928    3 Sheets-Sheet 1

Herman Hansen
INVENTOR

BY Robert S. Blair
ATTORNEY

Nov. 29, 1932.　　　H. HANSEN　　　1,889,461

KEY CUTTING APPARATUS

Original Filed March 27, 1928　　3 Sheets-Sheet 2

INVENTOR
Herman Hansen
BY Robert S. Blair
ATTORNEY

Nov. 29, 1932.                H. HANSEN                1,889,461
                         KEY CUTTING APPARATUS
                Original Filed March 27, 1928    3 Sheets-Sheet 3

Fig.5.

Patented Nov. 29, 1932

1,889,461

UNITED STATES PATENT OFFICE

HERMAN HANSEN, OF NEW YORK, N. Y., ASSIGNOR TO FRANCIS KEIL & SON, INC., A CORPORATION OF NEW YORK

KEY CUTTING APPARATUS

Application filed March 27, 1928, Serial No. 265,031. Renewed December 21, 1931.

This invention relates to key cutting apparatus. One of the objects thereof is to provide a key cutting apparatus which is practical and efficient. Another object is to provide an apparatus of the above nature capable of quickly cutting keys of the cylinder type in accordance with a code. Another object is to provide an apparatus of the above nature which is equally well adapted to cutting keys according to a code and for duplicate key cutting and in which the mechanism is so arranged that to adjust the apparatus to perform code cutting or duplicate cutting is accomplished conveniently and quickly. Another object is to provide a machine of the above nature which is of simple construction and free from complicated mechanism. Another object is to provide an apparatus of the above nature which is small and compact. Another object is to provide such an apparatus which is thoroughly dependable and accurate in operation. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention.

Similar reference characters refer to similar parts throughout the several views of the drawings.

Figure 3:
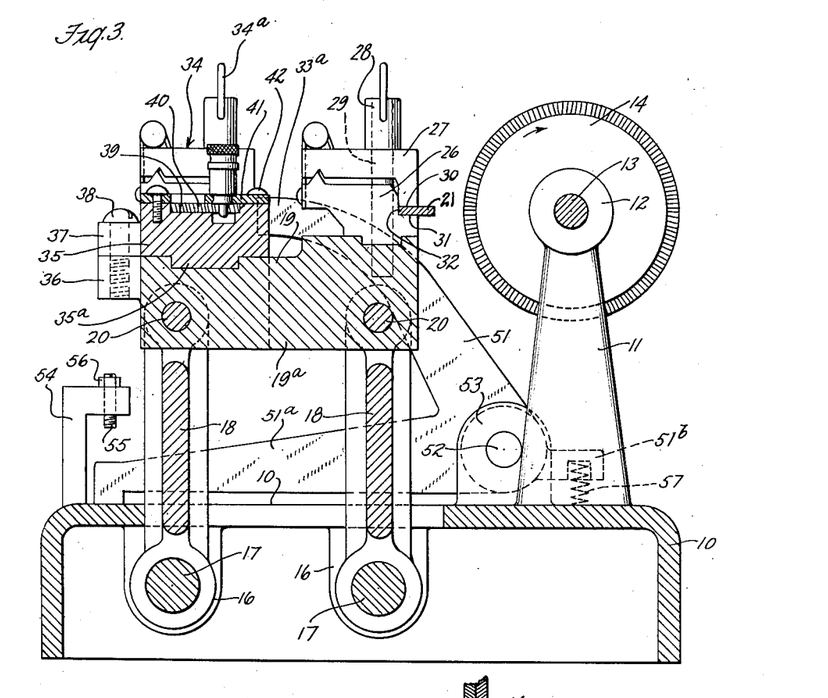
Figure 3 is a section taken as indicated by the line 3—3 in Figure 1.

Referring now to the drawings in detail, as shown in Figure 3 this apparatus is mounted upon a suitable table or base 10. Projecting upwardly from the base 10 is a standard 11 at the upper end of which is a bearing 12 rotatably supporting a shaft 13. Upon the end of the shaft 13 is fixed a cutter 14 which is shown more clearly in Figure 5. This cutter is removably held upon the end of the shaft preferably by means of a nut 15. The shaft 13 may be driven by any suitable driving means and it is rapidly rotated to rotate the cutter 14 preferably in the direction indicated by the arrow in Figure 3.

Figures 1, 2:
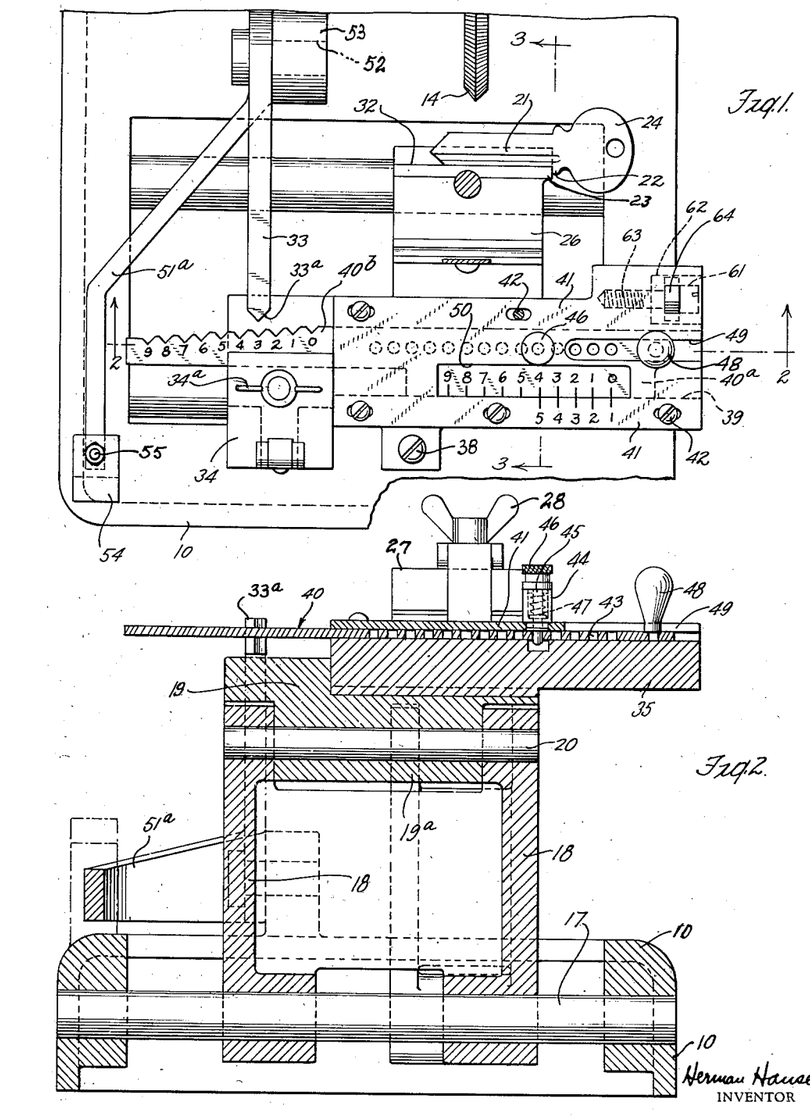
Figure 1 is a plan view partly broken away.
Figure 2 is a section taken as indicated by the line 2—2 in Figure 1.

In front of the standard 11 are lugs 16 projecting downwardly from the sudface of the table 10 and in which are supported a pair of parallel cylindrical rods 17 which extend horizontally and substantially parallel to the axis of the cutter 14 and the shaft 13. Mounted upon these parallel shafts 17 are four upright arms or links 18 which carry at their upper ends a block or table 19. At the upper ends of the links 18 are a pair of shafts or rods 20 which are parallel to the lower shafts or rods 17, these rods 20 passing through the upper ends of the arms 18 and through the lower portion 19a of the table 19, as shown in Figure 2. The supporting arms or links 18 are loosely mounted upon the supporting rods 17 for sliding movement thereon lengthwise of the rods and for swinging movement about the axes of the rods; the upper supporting rods 20 pass loosely through the upper ends of the supporting links 18. Thus the table 19 is supported by parallel links for horizontal movement toward and away from the cutter 14 in a direction substantially radially of the latter or transverse to its axis. Also, by sliding the links 18 along the rods 17 the table 19 is moved relative to the cutter 14 in a direction lengthwise of the cutter axis. The support of the table upon the parallel links causes it to remain continually in a horizontal plane as it is moved toward and away from the cutter 14.

Mounted upon the upper surface of the table 19 at the side thereof adjacent to the cutter 14 and at the right-hand end thereof as viewed in Figure 1 is a key-holding mechanism for holding a key blank to be operated upon by the cutter 14. In Figure 1 the upper portion of the key-holding or clamping mechanism is removed and a key blank is shown in position to be cut. This apparatus is adapted for cutting the notches in the edges of the shanks of keys of the cylinder type. These notches cooperate with the tumblers in the lock in the well-known manner, permitting the respective tumblers to fall a sufficient distance to release the cylinder of the lock and permit the key and cylinder to be turned to operate the lock. A standard form of cylinder lock has five tumblers and the keys are correspondingly provided with five "stations" along their edges, a notch of predetermined depth being cut at each one of these stations in accordance with the tumblers of the lock which the key is adapted to operate. As shown in Figure 1, the key blank is gripped in the clamping mechanism by its shank 21, a shoulder 22 on the key blank coming against a corner 23 of the clamping mechanism to determine the position of the key blank in the clamping mechanism, and the handle 24 projecting.

The clamping mechanism preferably employed, as shown in Figure 3, comprises a lower member 26 and an upper member 27, which are drawn together by a nut 28 threaded upon a bolt 29, the key shank being gripped between the jaws 30 and 31. This clamping mechanism need not be described in detail herein since it is preferably similar to that shown in my co-pending application Serial No. 178,953, filed March 28, 1927. It may be noted, however, that the action of this clamping mechanism is such that when the jaws are brought together with the key shank therebetween, the shank is drawn in firmly against the surface 32 of the clamping device (Figure 3). The clamping device is fixed in position upon the table 19 by the bolt 29 which passes downwardly into the table and thus, when the key blank is clamped in place its position with respect to the table 19 's fixed, the back edge of the shank being against the surface 32 and the shoulder 22 of the key blank being against the corner 23. From the description thus far, it will be seen that the key blank may be moved into engagement with the cutter in a direction transversely of the cutter axis, to cut a notch in the shank 21, by pushing the table 19 toward the cutter, the supporting legs or links 18 swinging upon the supporting rods 20 and 17; also, by moving the table in a direction lengthwise of the cutter axis, the supporting legs or links 18 sliding longitudinally along the supporting rods 17, the key blank is moved with respect to the cutter 14 to bring the respective stations thereof into position to be engaged by the cutter.

As shown in Figure 1, at the left of the cutter 14 is an outwardly projecting arm 33 which is adapted to limit the movement of the table 19 toward the cutter 14 and thereby determine the depth of notch which the cutter 14 makes in the key blank. The cutter 14 has a ridged peripheral cutting edge to cut a V-shaped notch in the key blank, and the end of the arm 33a, which may be called a stop or guide, is correspondingly tapered or pointed. Mounted upon the table 19 forwardly of the end of the guide 33, as shown in Figure 1, for example, is a key-holding or clamping device 34 which is preferably of the same type as the clamping device 26—27 which holds the key blank to be cut. When this apparatus is used for duplicating work, the key to be copied and to be reproduced in the key blank is clamped in this clamping device 34 and cooperates with the guide 33, as will be described more fully hereinafter. When the apparatus is employed for cutting keys according to code the clamping mechanism 34 is not disturbed but is simply loosened by unthreading the clamping nut 34a, the guide 33 cooperating with a mechanism which will now be described.

Referring to Figures 2 and 3, mounted upon the table 19 forwardly of the clamping device 26—27 is a block 35 having a part overhanging the right-hand end of the table, as shown in Figure 2. The member 35 has preferably a downward projection or rib 35a which mates with a corresponding recess in the surface of the table 19 to determine the position of the member 35 with respect to the table and to hold it against twisting thereon. As shown in Figure 3, projecting forwardly from the table 19 is a lug 36 and projecting from the member 35 is a corresponding lug 37. A screw 38 passes through the lug 37 and is threaded into the lug 36, securely and yet removably holding the block or member 35 in position upon the table.

In the upper surface of the member 35 is a longitudinal recess or groove 39 in which is slidably mounted an elongated plate or bar 40. On the top of the member 35 is a plate 41 which is held in place by screws 42.

As shown in Figure 1, the bar 40 has a relatively wide part 40a at its right-hand portion, which fits slidably between the sides of the groove 39, and a relatively narrow part 40b at its left-hand end. This part 40b projects from underneath the plate 41 in position to cooperate with the guide 33 and it passes through the clamping device 34 in substantially the position which is occupied by the master key or key to be copied when the machine is used for duplicating work. In the edge of this part 40b of the bar 40 are formed ten notches, the bases of which are at different distances from a line passing through the guide and parallel to the cutter axis. It will be seen that, by moving the table 19 bodily on the supporting rods 17, any one of these ten notches may be brought into a position to cooperate with the guide and regulate the depth of cut taken in the key blank when the table is moved to carry the key blank against the cutter. By sliding the bar 40 in the block 35 the position of the bar is likewise changed with respect to the guide 33 and also with respect to the table 19 and the key blank 21.

In the bar 40 is a row of holes 43 extending longitudinally of the bar and uniformly spaced. Mounted upon the top plate 41 is a small cylinder 44 through which passes a vertical pin or plunger 45 having an outer head or finger piece 46. The pin 45 is preferably urged downwardly by means of a spring 47 contained within the cylinder 44 and its lower end projects through the plate 41 and is adapted to cooperate with the holes 43 to lock the bar 40 against sliding movement in the block 35. At its right-hand end the bar 40 is provided with an upwardly projecting handle 48 by means of which it may be slid conveniently when the head 46 is pulled upwardly to draw the pin 45 out of the path of the bar. The handle 48 operates in a slot 49 in the plate 41.

The ten different notches in the part 40b of the bar 40 provide for cutting in the key blank notches of ten different depths. These notches in the bar are numbered from 0 to 9, as shown in Figure 1, and they are spaced apart a distance equal to the distance between adjacent stations on the key. The right-hand part 40a of the bar 40 has on its forward edge graduations likewise numbered from 0 to 9 and likewise spaced apart a distance equal to the distance between the centers of adjacent stations on the key. These graduations are visible through a slot 50 in the plate member 41. On the plate member 41 at the edge of the slot 50 are provided five marks or graduations corresponding to the stations on the key and similarly spaced and numbered 1–5. It will be seen that, with five stations on the key and with ten different notch depths available, a wide number of combinations of notches may be employed to produce a correspondingly large number of different keys each having a different code number. For example, let it be assumed that it is desired to cut a key having the code number 17976; this means that number 1 station on the key, the station nearest the handle, is to have a notch of depth 1, the next station is to have a notch of depth 7, the next depth 9, the next depth 7, and the last one depth 6. This machine is capable of cutting a key to have any combination of numbers, or code number, such as the above.

It will be seen that the cutter 14 is a predetermined distance from the guide 33 in a direction axially of the cutter, the station graduations on the plate 41 are positioned in predetermined relation with respect to the stations on the key in a direction axially of the cutter and the graduations on the bar portion 40a have a fixed relation to the notches on the bar portion 40b in a direction lengthwise of the cutter axis. The parts are so related that, for example, when the bar 40 is adjusted so that the graduation marked 0 thereon is alined with the graduation marked 1 on the plate 41, as shown in Figure 1, and when the table 19 is moved so that the cutter 14 is positioned to act upon station 1 of the key blank, then the notch 0 in the bar 40 is positioned to coact with the guide 33. Because of the relation of the parts it follows that when any graduation number on the bar is alined with a given station graduation mark on the plate 41, and the table 19 is so positioned that the cutter 14 will act upon the corresponding station on the key blank, the corresponding notch on the bar will be in position to coact with the guide 33. The pin 45 cooperates with the holes 43 in the bar 40 to hold the bar 40 in the position to which it is moved in adjusting the graduation marks thereon with respect to the station graduation marks on the plate 41. The holes 43 are spaced a distance corresponding to the spacing between the graduations and they are of such number that the bar may be locked thereby in position with any one of the graduations on the bar lined up with any of the five station graduation marks on the plate 41.

Figure 4:
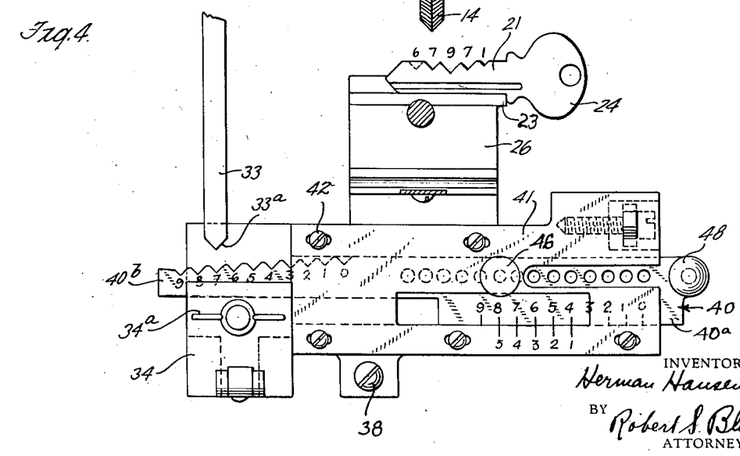
Figure 4 is a view similar to Figure 1 showing the parts in a different state of adjustment.

Considering now the operation of this apparatus, let it be assumed that a key is to be cut having the above-mentioned code number 17976. The key blank is first clamped in position in the clamping device 26—27, as shown in Figure 1, and thereupon the bar 40 is adjusted in position in the block 35 so that the graduation mark 1 on the bar is lined up with the station graduation mark 1 on the plate 41. This is accomplished by raising the handle 46 to lift the pin 45 out of the path of the bar and, after the adjustment has been made, the pin is allowed to drop into the hole 43 therebeneath to lock the bar in the position to which it is adjusted. The above adjustment having been made, the table 19 is moved bodily on the supporting rods 17 until notch 1 on the bar is lined up with the guide 33, the cutter 14 being then opposite station 1 on the key blank as above described. The table 19 is then moved toward the cutter, the cutter operating upon the edge of the key blank at station 1 thereof until the guide 33, cooperating with the notch 1, arrests the inward movement of the table. A notch of number 1 depth having thus been cut at station number 1, the bar 40 is moved to bring the graduation 7 thereon in registry with the station graduation 2 on the plate 41; the table 39 is then moved lengthwise along the supporting rod 17 to bring the notch 7 on the bar 40 in line with the guide 33, the cutter 14 being now in line with station number 2 on the key blank and the notch of a depth number 7 being cut at this station just as the notch of number 1 depth was cut at station number 1. This process is repeated for each of the five stations on the key blank and it will be seen that any station may be given any one of the ten available depths of notch. In Figure 4 there is shown being cut a key having the above code number 17976, the parts being shown in their position just after station number 4 has been cut with its number 7 notch. It will be seen that this apparatus is thus extremely simple to operate and it is capable of very quickly cutting keys having any desired code number consisting, for example, of any combinations of five of the numbers 0–9. I wish it to be understood, however, that I may vary the number of stations and/or vary the number of depths to make any desired combinations thereof, all without departing from my invention, and that I have referred to five stations and ten depths merely by way of illustration.

Considering more particularly the construction of the guide or stop 33, as has been pointed out it has an end portion 33a cooperating with the notches in the bar 40 which is tapered or wedge-shaped to correspond substantially with the shape of the notches to be cut. The arm 33 is preferably substantially horizontal and projects forwardly from the upper end of an arm 51 (Figure 3) which is pivoted at its lower end upon a pin 52 in a lug 53 on the table 10. The arm 51 has the general shape of a bell crank with a forwardly projecting arm 51a the forward end of which moves in a substantially vertical direction as the arm 51 swings about its pivot 52. The arm 51a is preferably bent or shaped to extend laterally of and out of range of the movable parts of the apparatus, as will be clear from Figures 1, 2 and 5. Adjacent its pivot at 52, the arm 51 is extended rearwardly as at 51b and between the extension 51b and the bed 10 of the machine is a spring 57 tending to swing the arm in counter-clockwise direction as viewed in Figure 3. The swinging of the arm 51 in counter-clockwise direction is limited by the bed 10, against which the arm 51a comes to rest, as seen in Figure 3, while swinging of the arm in clockwise direction about the pivot 52 is limited by an adjustable set screw 55 supported by the bracket 54 on the bed 10. A lock nut 56 locks the set screw in its adjusted position.

When the arm 51 swings, it will be seen that the stop or guide 33 moves in a direction transverse to the cutter axis and substantially horizontally, swinging movement of the arm 51 being through only a few degrees. The spring 57 holds the guide 33 forwardly toward the bar 40 of Figure 4 or toward a master key 65 of Figure 5 clamped in the clamping device 34. When the table 19 is moved toward the cutter in order to carry the key blank into engagement with the cutter and to cut a notch in the key blank, the guide 33 first comes into engagement with the notch with which it coacts and then, upon continued movement of table 19, yields rearwardly a distance permitted by the set screw 55. Thus, the tapered end 33a of the guide preferably enters into engagement with the notch with which it coacts and seats therein before the key blank and the cutter come into engagement. Thereafter, while the notch in the key blank is being cut, the guide 33 yields against the action of the spring 57 until the arm 51a comes against the set screw 55, at which point the cutting of the notch in the key blank is completed, the depth being regulated by the depth of the notch with which the guide 33 is coacting or the distance of the base of this notch from a line parallel to the cutter axis. This preliminary engagement of the guide with the V-shaped notch insures accurate cutting in that it insures dependable guiding of the table 19 and holding thereof against lateral movement as it moves toward the cutter, and insures that the notches cut in the key blank will be cut exactly at the stations where they are intended to be. The engagement between the guide and its notch prevents the table from moving slightly in one direction or the other lengthwise of the cutter axis as the cutting operation is being performed.

As explained above, the distance between the cutter 14 and the guide 33 in a direction lengthwise of the cutter axis is a fixed distance which must be properly related to the parts carried upon the table 19. It sometimes occurs that the cutters have hubs of slightly different axial lengths and consequently when a cutter is removed and a new one is substituted therefor the axial distance between the cutter and the guide or stop 33 is changed. As shown in Figure 1, and as hereinbefore described, the plate member 41 is held in place upon the block 35 by means of screws 42. These screws 42 are threaded into the block 35 and they pass through slots in the plate which extend in a direction lengthwise of the cutter axis. Thus, the plate 41 may be adjusted in a direction lengthwise of the cutter axis with respect to the table 19 and hence with respect to the key blank being cut. In order to make this adjustment there is provided an adjusting screw 61 which is set into a recess 62 in the block 35, as shown in Figure 1, and which is threaded into the block as shown at 63. This screw has a collar 64 which projects through a slot in the plate member 41 and causes the latter to move with the screw. Thus, by turning the screw 61 the plate member 41 is adjusted in position in a direction lengthwise of the axis of the cutter, and relative to the table 19, in order to properly locate the station graduation marks on the plate with respect to the key blank, in case the distance between the cutter 14 and the guide 33 should change.

Figure 5:
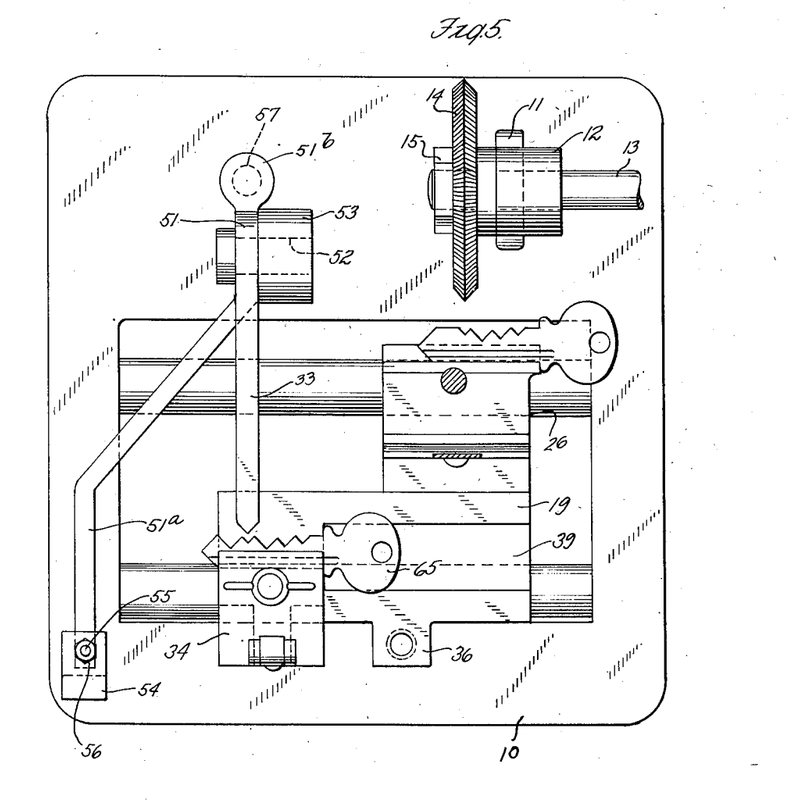
Figure 5 is a plan view showing the apparatus arranged for duplicating work.

When this machine is employed for duplicating work the screw 38 is removed and then the block 35, together with the bar 40 and other parts carried thereby, is bodily slid off the table 19. In Figure 5 the apparatus is shown with these parts thus removed. Thereupon the master key, or key to be copied, is clamped in the clamping device 34, a key 65 being shown in position therein in Figure 5. The guide or stop 33 now cooperates with the notches in the key 65 just as it does with the notches in the edge of the bar 40. When the table 19 is moved toward the cutter with the table positioned so that the guide 33 enters a notch in the key 65, then a corresponding notch is cut at the corresponding station in the key blank held in the clamping device 26—27. When the apparatus is in the condition shown in Figure 5, in order to adapt it to code cutting, the block 35, with the parts carried thereby, is again placed in position and the screw 38 inserted to hold it in place. Thus, it will be seen that this machine is adjusted with the greatest convenience for either code cutting or duplicating work. The apparatus is capable of quickly and with a high degree of accuracy cutting keys either by code or in duplication of a master key or key to be copied.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a key cutting machine, in combination, a rotating cutter having a peripheral cutting edge, a table movable toward and away from said cutter in a direction transverse to its axis and movable in a direction lengthwise of said axis, means on said table adapted to hold a key blank to be notched by said cutter, a bar on said table having a plurality of notches, a guide adapted to coact with said notches to limit the movement of said table toward said cutter, guiding means on said table for slidably supporting said bar for movement in a direction lengthwise of the cutter axis and relative to said key-holding means, means for determining the position of said bar so that any selected notch therein corresponds to a certain station on the key blank held in said key-holding means, and means for holding said bar in the selected position.

2. In a key cutting machine, in combination, a cutter, a table adjacent thereto, means on said table for holding a key blank to be notched by said cutter, said table being movable in a direction transversely of the cutter axis for moving said key blank into and out of engagement with said cutter and being movable in a direction lengthwise of the cutter axis to move said key blank lengthwise with respect to the cutter, a guide positioned at a fixed distance from said cutter in a direction lengthwise of the cutter axis, a bar on said table having a plurality of notches spaced in a direction lengthwise of the cutter axis and facing toward said guide, the bases of said respective notches being at different distances from a line passing through the guide and parallel to the cutter axis, said guide being adapted to cooperate with said notches to limit the movement of said table toward said cutter, guiding means on said table for slidably supporting said bar for movement along a line parallel to said above-mentioned line, and means for holding said bar with respect to said guiding means so that any selected notch therein corresponds to any selected station on the key blank held in said holding means.

3. In a key cutting machine, in combination, a cutter, a table adjacent thereto, means on said table for holding a key blank to be notched by said cutter, said table being movable in a direction transversely of the cutter axis for moving said key blank into and out of engagement with said cutter and being movable in a direction lengthwise of the cutter axis to move said key blank lengthwise with respect to the cutter, a guide positioned at a fixed distance from said cutter in a direction lengthwise of the cutter axis, a bar on said table having a plurality of notches spaced in a direction lengthwise of the cutter axis and facing toward said guide, the bases of said respective notches being at different distances from a line passing through the guide and parallel to the cutter axis, said guide being adapted to cooperate with said notches to limit the movement of said table toward said cutter, and said bar being adjustable in position on said table in a direction lengthwise of the cutter axis, index marks on the table in predetermined relation to the key holding means and spaced apart in a direction lengthwise of the cutter axis to correspond with the spacing between the centers of the notches to be cut in the key blank, and index marks on said bar for cooperating with said index marks on the table, said index marks on the bar being positioned in predetermined relation to said notches on the bar and corresponding in number and spacing to said notches.

4. In a key cutting machine, in combination, a rotary cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the length of the key blank to bring the cutter and the key blank into engagement, and means operating during a halting in said first movement for limiting said last movement to determine the depth of notch cut in the key blank at any given station thereof, said last means including a stop guide, means having a plurality of possible cooperating relations with said guide to provide a like plurality of possible different limiting actions on said second movement, and means providing for relative movement between said guide and said cooperating means for establishing any one of said plurality of cooperating relations and for making the corresponding limiting action effective for any station on the key blank held by said key-holding means.

5. In a key cutting machine, in combination, a rotary cutter, means for holding a cylinder key blank in position to be notched by said cutter, said cutter additional holding means relatively fixedly mounted with respect to said first-mentioned holding means, and said holding means being relatively movable in a direction lengthwise of the cutter axis to bring different portions of the key blank corresponding to different stations thereof into operative relation to the cutter and being relatively movable in a direction transversely of the cutter axis to bring the cutter and the key blank into engagement, and means operating during a halting in said first movement for limiting said last movement to determine the depth of notch cut in the key blank at any given station thereof, said last means including a notched part carried by said second-mentioned holding means, and means to indicate the adjustment and to identify the same by the depth of notch to be cut in accordance therewith.

6. In a key cutting machine, in combination, a rotary cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, and means operating during a halting in said first movement for limiting said last movement to determine the depth of notch cut in the key blank at any given station thereof, said last means including a guide and a bar having an edge portion adapted to engage said guide and having in said edge a plurality of notches which cooperate with said guide for cutting notches of different depths, and means for fixedly changing the relative positions of said bar and of said key-holding means and cutter to cause any selected notch in said bar to be effective for any selected station of the key blank in said key-holding means.

7. In a key cutting machine, in combination, a support for a rotary cutter, a support for holding a cylinder key blank in position to be notched by said cutter, said supports being relatively movable in a direction lengthwise of the key blank to bring different portions of said key blank corresponding to different stations thereof into operative position with respect to said cutter and being relatively movable in a direction transverse to the key blank to bring said cutter and said key blank into and out of operative engagement, a guide relatively fixed in position with respect to one of said supports, and means on the other of said supports adapted during a halting in said first movement to cooperate with said guide to limit the relative movement of said supports in a direction transverse to the key blank thereby to determine the depth of notch cut in the key blank, and means mounting said first-mentioned means on said other of said supports whereby it is adjustable with respect to said other support for cutting notches of a plurality of predetermined depths and being graduated in code numbers to indicate its adjustment.

8. In a key cutting machine, in combination, a support for a rotary cutter, a support for holding a cylinder key blank in position to be notched by said cutter, said supports being relatively movable in a direction lengthwise of the key blank to bring different portions of said key blank corresponding to different stations thereof into operative position with respect to said cutter and being relatively movable in a direction transverse to the key blank to permit said cutter to operate upon said key blank, a guide fixed in position with respect to one of said supports, a bar on said second support having an edge portion adapted during a halting in said first movement to cooperate with said guide to limit the relative movement of said supports in a direction transverse to the key blank thereby to determine the depth of notch cut in the key blank, said edge portion thereof having a plurality of parts adapted to be brought individually into position to coact with said guide, and said individual parts being adapted to coact with said guide to effect cutting in said key of notches of a plurality of different predetermined depths, means movably supporting said bar on said second support for movement of said bar for the selection of any one of said plurality of parts of its portion for coaction with said guide, and means for holding said bar against movement relative to said second support.

9. In a key cutting machine, in combination, a support for a rotary cutter, a support for holding a cylinder key blank in position to be notched by said cutter, said supports being relatively movable in a direction lengthwise of the cutter axis to bring different portions of said key blank corresponding to different stations thereof into operative position with respect to said cutter and being relatively movable in a direction transverse to the cutter axis to bring said cutter and said key blank into and out of operative engagement, a guide fixed in position with respect to one of said supports in a direction lengthwise of the cutter axis, a bar on said second support having an edge portion adapted to cooperate with said guide to limit the relative movement of said supports in a direction transverse to the cutter axis thereby to determine the depth of notch cut in the key blank, said edge portion thereof having a plurality of parts adapted to be brought individually into position to coact with said guide by relatively moving said supports in a direction lengthwise of the cutter axis, and said individual parts being adapted to coact with said guide to effect cutting in said key blank of notches of a plurality of different predetermined depths, and said bar being adjustable in position on said second support in a direction lengthwise of the cutter axis to adjust said bar with respect to said guide and with respect to the plane of operative engagement between the cutter and the key.

10. In a key cutting machine, in combination, a support for a rotary cutter, a support for holding a cylinder key blank in position to be notched by said cutter, said supports being relatively movable in a direction lengthwise of the cutter axis to bring different portions of said key blank corresponding to different stations thereof into operative position with respect to said cutter and being relatively movable in a direction transversely to the cutter axis to bring said cutter and said key blank into and out of operative engagement, a guide fixed in position with respect to one of said supports in a direction lengthwise of the cutter axis, a bar on said second support having an edge portion adapted to cooperate with said guide to limit the relative movement of said supports in a direction transverse to the cutter axis thereby to determine the depth of notch cut in the key blank, said edge portion thereof having a plurality of parts adapted to be brought individually into position to coact with said guide by relatively moving said supports in a direction lengthwise of the cutter axis, and said individual parts being adapted to coact with said guide to effect cutting in said key blank of notches of a plurality of different predetermined depths, and said bar being adjustable in position on said second support in a direction lengthwise of the cutter axis to adjust said bar with respect to said guide and with respect to the plane of operative engagement between the cutter and the key blank, and coacting graduations on said bar and said second support adapted to indicate said last adjustment in terms of depth of notch to be cut and the station on the key blank at which the notch is to be cut.

11. In a key cutting machine, in combination, a rotary cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, an elongated member on said table extending lengthwise of the cutter axis and adjustable relative to said table in a direction lengthwise of said axis, a guide adapted to cooperate with an edge of said elongated member to limit the movement of said table toward said cutter and regulate the depth of notch cut in said key blank, said edge having a plurality of portions spaced at different distances from a line through said guide and parallel to the cutter axis, said portions being spaced from one another in a direction lengthwise of the cutter axis by distances substantially equal to the spaces between adjacent stations on the key blank and said portions being adapted respectively to cooperate with said guide to effect cutting in said key blank of a different depth of notch, graduations on said elongated member corresponding in number to said plurality of portions thereof and similarly spaced in a direction lengthwise of the cutter axis, and graduations on a part of said table corresponding in number to the stations on the key blank and similarly spaced in a direction lengthwise of the cutter axis, said graduations on said elongated member being adapted to cooperate with said graduations on said table and said parts being so related that, when any one of said graduations on the elongated member is opposite any one of said station graduations on said table and when said table is moved so that the portion of said elongated member corresponding to said one graduation thereon is positioned to coact with said guide, the cutter and the key blank are in position for the cutter to operate upon the key station corresponding to said one station graduation.

12. In a key cutting machine, in combination, a rotating cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, an elongated member on said table extending lengthwise of the cutter axis and adjustable relative to said table in a direction lengthwise of said axis, a guide adapted to cooperate with an edge of said elongated member to limit the movement of said table toward said cutter and regulate the depth of notch cut in said key blank, said edge having a plurality of portions spaced at different distances from a line through said guide and parallel to the cutter axis, said portions being spaced from one another in a direction lengthwise of the cutter axis by distances substantially equal to the spaces between adjacent stations on the key blank and said portions being adapted respectively to cooperate with said guide to effect cutting in said key blank of a different depth of notch, graduations on said elongated member corresponding in number to said plurality of portions thereof and similarly spaced in a direction lengthwise of the cutter axis, a plate on said table having graduations corresponding in number to the stations on the key blank and similarly spaced in a direction lengthwise of the cutter axis, said graduations on said elongated member being adapted to cooperate with said graduations on said table and said parts being so related that, when any one of said graduations on the elongated member is opposite any one of said station graduations on said table and when said table is moved so that the portion of said elongated member corresponding to said one graduation thereon is positioned to coact with said guide, the cutter and the key blank are in position for the cutter to operate upon the key station corresponding to said one station graduation, and means for adjusting the position of said plate in a direction lengthwise of the cutter axis to change the position of said station graduations with respect to the key blank.

13. In a key cutting machine, in combination, a rotary cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, an elongated member on said table extending lengthwise of the cutter axis and adjustable relative to said table in a direction lengthwise of said axis, a guide adapted to cooperate with an edge of said elongated member to limit the movement of said table toward said cutter and regulate the depth of notch cut in said key blank, said edge having a plurality of portions spaced at different distances from a line through said guide and parallel to the cutter axis, said portions being spaced from one another in a direction lengthwise of the cutter axis by distances substantially equal to the spaces between adjacent stations on the key blank and said portions being adapted respectively to cooperate with said guide to effect cutting in said key blank of a different depth of notch, graduations on said elongated member corresponding in number to said purality of portions thereof and similarly spaced in a direction lengthwise of the cutter axis, and graduations on a part of said table corresponding in number to the stations on the key blank and similarly spaced in a direction lengthwise of the cutter axis, said graduations on said elongated member being adapted to cooperate with said graduations on said table and said parts being so related that, when any one of said graduations on the elongated member is opposite any one of said station graduations on said table and when said table is moved so that the portion of said elongated member corresponding to said one graduation thereon is positioned to coact with said guide, the cutter and the key blank are in position for the cutter to operate upon the key station corresponding to said one station graduation, said elongated member having a longitudinal row of recesses therein spaced apart distances substantially equal to the spacing between adjacent stations on the key blank, and means on the table to cooperate with said recesses for locking said elongated member against movement on said table, said last means and said cooperating recesses being capable of locking said elongated member in position with any one of said graduations thereon coacting with any one of said station graduations on said table.

14. In a key cutting machine, in combination, a rotating cutter for notching cylinder keys, a table adjacent thereto, means on said table for holding a key blank to be notched by said cutter, said table being movable in a direction transversely of the cutter axis to move said key blank toward and away from said cutter and being movabe in a direction lengthwise of the cutter axis to bring the different stations on the key blank in position to be engaged by the cutter, an elongated member on said table extending lengthwise of the cutter axis and adjustable relative to said table in a direction lengthwise of said axis, a guide adapted to cooperate with an edge of said elongated member to limit the movement of said table toward said cutter and regulate the depth of notch cut in said key blank, said edge having a plurality of portions spaced at different distances from a line through said guide and parallel to the cutter axis, said portions being spaced from one another in a direction lengthwise of the cutter axis by distances substantially equal to the spaces between adjacent stations on the key blank and said portions being adapted respectively to cooperate with said guide to effect cutting in said key blank of a different depth of notch, graduations on said elongated member corresponding in number to said plurality of portions thereof and similarly spaced in a direction lengthwise of the cutter axis, and graduations on a part of said table corresponding in number to the stations on the key blank and similarly spaced in a direction lengthwise of the cuttter axis, said graduations on said elongated member being adapted to cooperate with said graduations on said table and said parts being so related that, when any one of said graduations on the elongated member is opposite any one of said station graduations on said table and when said table is moved so that the portion of said elongated member corresponding to said one graduation thereon is positioned to coact with said guide, the cutter and the key blank are in position for the cutter to operate upon the key station corresponding to said one station graduation, said elongated member and said part of said table having said station graduations being removable as a unit from said table, and means on said table adapted to hold a master key to cooperate with said guide and in predetermined relation to said key blank to be cut.

15. In a key cutting machine, in combination, a rotating cutter for notching cylinder keys, a table adjacent thereto, means on said table for holding a key blank to be notched by said cutter, said table being movable in a direction transversely of the cutter axis to move said key toward and away from said cutter and being movable in a direction lengthwise of the cutter axis to bring the different stations on the key blank in position to be engaged by the cutter, a guide, means on said table for cooperating with said guide to cut said key blank by code, and means on said table for holding a master key to cooperate with said guide for duplicating work.

16. In a key cutting machine, in combination, a rotating cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, a guide, means on said table for cooperating with said guide to cut said key blank by code, and means on said table for holding a master key to cooperate with said guide for duplicating work, said first means being removable and replaceable as a unit.

17. In a key cutting machine, in combination, a rotating cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, a guide, a clamping device on said table for holding a master key to cooperate with said guide for duplicating work, and a notched bar on said table for cooperating with said guide in cutting said key blank by code, said bar passing through said clamping device in substantially the position which the master key occupies therein and being removable therefrom.

18. In a key cutting machine, in combination, a rotating cutter for notching cylinder keys, a table adjacent thereto, means on said table for holding a key blank to be notched by said cutter, said table being movable in a direction transversely of the cutter axis to move said key blank toward and away from said cutter and being movable in a direction lengthwise of the cutter axis to bring the different stations on the key blank in position to be engaged by the cutter, a guide, a notched bar member on said table for cooperating with said guide in cutting said key blank by code, means releasably securing said bar member on said table whereby manual adjustment may be achieved of said bar member in a direction lengthwise of the cutter axis, and means for indicating the adjustment of said bar with respect to the stations on the key blank.

19. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, and indexing means for relating said cutter and a key blank held in said holding means to each other to permit cutting of any desired combination of notches, one for each station of said key blank, selected from a plurality of possible different depths of notches, said indexing means including a stop for limiting both of said relative movements, means coacting with said stop having portions adapted each, when coacting with said stop, to give a different limiting action of said stop upon relative movement between said cutter and said key-holding means in a direction transversely of the key blank, and means for selectively relating any desired portion of said last-mentioned means to said stop for any operative relation between said cutter and any key station.

20. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a stop for limiting both of said relative movements, a member having a plurality of notches each of a different depth and each notch adapted to coact with said stop to limit relative movement between said cutter and said key-holding means in a direction transversely of the key blank, and means for selectively relating any desired notch in said member for coaction with said stop for any station of said key blank.

21. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a stop for limiting both of said relative movements, a member having a plurality of notches each of a different depth and each notch adapted to coact with said stop to limit relative movement between said cutter and said key-holding means in a direction transversely of the key blank, means movably mounting each member so that any notch therein may be positioned for coaction with said stop, and means for relatively positioning said member and a key blank held in said key-holding means to permit any selected notch in said member to coact with said stop for any operative relation between said cutter and any station in the key blank held in said key-holding means.

22. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a stop for limiting movement between said cutter and key-holding means in a direction transversely of the key blank, means positioned for coaction with said stop and mounted to partake of the same relative movement as takes place in a direction transversely of the key blank between said cutter and said key-holding means, said means having a plurality of portions each adapted to coact with said stop and each having a different limiting action upon said relative transverse movement, and means mounting said first-mentioned means to permit selection of any portion thereof for coaction with said stop for any station of a key blank held in said key-holding means.

23. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a stop for limiting movement between said cutter and key-holding means in a direction transversely of the key blank, means positioned for coaction with said stop and mounted to partake of the same relative movement as takes place in a direction transversely of the key blank between said cutter and said key-holding means, said means having a plurality of portions each adapted to coact with said stop and each having a different limiting action upon said relative transverse movement, said means having said portions extending in a direction generally lengthwise of the key blank, and means mounting said means that coacts with said stop for relative movement with respect to said key-holding means whereby any portion thereof may be presented for coaction with said stop for any station of the key blank.

24. In a key cutting machine, in combination, a frame having a rotating cutter associated therewith, a table having thereon means for holding a key blank to be operated upon by said cutter, and means supporting said table for movement in a direction toward or away from said cutter so that said table and a key blank held thereby move parallel to themselves as the key blank is moved into engagement with the cutter to have a notch cut therein, said supporting means comprising parallel links spaced apart in the said direction of movement of said table, two pivotal supports on said table and spaced apart in the said direction of movement thereof, each for the upper end of one of said links, and two pivotal supports in said frame spaced apart in the said direction of movement of said table, each support for the lower end of one of said links.

25. In a key cutting machine, in combination, a frame having associated therewith a rotatable cutter, movable means for holding a key blank to be operated upon by said cutter, a stop associated with said frame, means movable with said key blank-holding means adapted to coact with said stop to limit the movement of said key-holding means in a direction toward said cutter, thereby to limit the depth of cut effected by said cutter, and means supporting said key-holding means for movement thereof toward or away from said cutter in a path such that a key blank held in said key-holding means is moved substantially parallel to itself, said supporting means including parallel links spaced apart in the said direction of movement of said key-holding means and pivotally connected at spaced points to said key-holding means and at substantially similarly spaced points to said frame, the axes of said pivotal connections being located at the apexes of a parallelogram.

26. In a key cutting apparatus, in combination, a cutter for notching cylinder keys, a support, means on said support for holding a key blank to be notched by said cutter, a stop for limiting the cutting action of said cutter, a clamping device carried by said support for holding a master key to cooperate with said stop for duplicating work, said stop and both said key blank holding means and said clamping device being relatively movable in a direction lengthwise of the key blank so that said stop may be brought into coacting relation successively with the notches in a master key held in said clamping device, and a bar having an edge portion that has a plurality of parts adapted individually to coact with said stop to determine the limiting action of said stop when cutting said key blank by code, said bar passing through said clamping device in substantially the position which the master key occupies when inserted therein and said bar being removable therefrom.

27. In a device for cutting keys according to code, in combination, a cutter, means for holding a cylinder key blank in position to be notched by said cutter, and indexing means for relating said cutter and a key blank held in said holding means to each other to permit cutting of any desired combination of notches, one for each station of said key blank, selected from a plurality of possible different depths of notches, said indexing means including a stop for limiting the depth of cut of said cutter, said stop and said key blank holding means being relatively movable in a direction lengthwise of the key blank so that said cutter may operate at different stations of the key blank, a bar slidably supported for coaction with said stop, said bar having portions adapted each, when coacting with said stop, to give a different limiting action of said stop, means for locking said bar in position with any selected portion thereof coacting with said stop for any selected station of the key blank, and indicia for indicating the depth of cut which said cutter is permitted to take by said stop and the station on the key blank at which said indicated depth of cut is made by said cutter.

28. In a device for cutting keys according to code, in combination, a cutter, means for holding a cylinder key blank in position to be notched by said cutter, and indexing means for relating said cutter and a key blank held in said holding means to each other to permit cutting of any desired combination of notches, one for each station of said key blank, selected from a plurality of possible different depths of notches, said indexing means including a stop for limiting the depth of cut of said cutter, said stop and said key blank holding means being relatively movable in a direction lengthwise of the key blank so that said cutter may operate at different stations of the key blank, a gage bar having a plurality of edge portions each adapted individually to coact with said stop and each giving said stop a different limiting action, said gage bar being mounted slidably to permit any portion thereof to be positioned for coaction with said stop for any selected station position of said stop, and means for releasably holding said gage bar in selected position.

29. In a device for cutting keys according to code, in combination, a cutter for cutting notches in a key blank, means including a stop member for determining the station on the key at which said cutter is to cut and for determining the depth of notch that the cutter is to cut, means for holding a key blank to be operated upon by said cutter, said key-holding means and said stop member being relatively movable in a direction lengthwise of the key blank whereby the station on the key blank at which a notch is to be cut may be selected, and gaging means associated with said key blank holding means but movably mounted with respect to said stop member and having a plurality of different portions each adapted to give said stop member a different depth-limiting action upon said cutter, said movable mounting thereof permitting any portion of said gaging means to be operatively related to said stop for any station position thereof with respect to said key blank.

30. In a device for cutting keys according to code, in combination, a cutter for cutting notches in a key blank, means including a stop member for determining the station on the key at which said cutter is to cut and for determining the depth of notch that the cutter is to cut, means for holding a key blank to be operated upon by said cutter, said key-holding means and said stop member being relatively movable in a direction lengthwise of the key blank whereby the station on the key blank at which a notch is to be cut may be selected, gaging means associated with said key blank holding means but movably mounted with respect to said stop member and having a plurality of different portions each adapted to give said stop member a different depth-limiting action upon said cutter, said movable mounting thereof permitting any portion of said gaging means to be operatively related to said stop for any station position thereof with respect to said key blank, and indicia for visually indicating the selected depth of cut permitted by said stop member and the selected station at which said depth of cut is to be made by the cutter.

31. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, and indexing means for relating said cutter and a key blank held in said holding means to each other to permit cutting of any desired combination of notches, one for each station of said key blank, selected from a plurality of possible different depths of notches, said indexing means including a stop for limiting both of said relative movements, a notched bar coacting with said stop, the notches being of varied depth and adapted each, when coacting with said stop, to give a different limiting action of said stop to relative movement between said cutter and said key-holding means in a direction transversely of the key blank, and means forming a guideway for supporting said bar for sliding movement in a direction lengthwise of the bar, whereby said bar is positionable to bring any desired notch thereon into coacting relation with said stop irrespective of the relative position between said cutter and said holding means in a direction lengthwise of the key blank.

32. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a stop for limiting both of said relative movements, a notched bar coacting with said stop, the notches being of varied depth and adapted each, when coacting with said stop, to give a different limiting action of said stop to relative movement between said cutter and said key-holding means in a direction transversely of the key blank, means forming a guideway for slidably supporting said bar and including a member having a channel formed therein whose side and bottom walls extend in a direction lengthwise of said key blank, said bar being received within said channel, and a plate closing over said channel and extending over said bar, whereby said bar is positionable along said channel to bring any desired notch thereon into coacting relation with said stop.

33. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a relatively fixed abutment, an abutment fixedly related to and movable with said holding means, and means interposed between said two abutments for determining the cutting action of said cutter on said key blank, said interposed means comprising a stop for affecting both of said movements and a member having portions graduated in thickness, each adapted to coact with said stop and to cause the latter to have a different limiting action upon said transverse movement in accordance with which portion of said member coacts with said stop, and means movably supporting said member whereby any one of its portions and said stop may be interposed between said two abutments.

34. In a machine for cutting keys according to code, in combination, a cutter, means for holding a cylinder key blank in position to be notched by said cutter, said cutter and said holding means being relatively movable in a direction lengthwise of the key blank to bring different portions of the key blank corresponding to different stations thereof into operative relation to the cutter and being relatively movable in a direction transversely of the key blank to bring the cutter and the key blank into engagement, indexing means for relating said cutter and a key blank held in said holding means to each other to permit cutting of any desired combination of notches, one for each station of said key blank, selected from a plurality of possible different depths of notches, said indexing means including a relatively fixed abutment, means forming a second abutment relatively fixed with respect to said holding means, and means for selectively limiting the depth of notches cut in said key blank by said cutter upon relative movement therebetween in a direction transversely of the key blank, said last-mentioned means including a member of fixed length and a notched bar member, the notches therein being of different depths and each adapted to coact with said member, said two members being interposed one after the other between said two abutments, and means movably mounting one of said members to permit said fixed-length member and any notch in said bar member to be brought at will into coacting relation.

35. In a key cutting machine, in combination, a rotating cutter for notching cylinder keys, a table adjacent thereto, means on said table for holding a key blank to be notched by said cutter, a frame rotatably supporting said cutter, means mounting said table on said frame for movement of the table in a direction transversely of a key blank held in said holding means to move said key toward or away from said cutter and for movement in a direction lengthwise of said key blank to bring different stations on the key blank in position to be engaged by the cutter, means on said table for holding a master key when the machine is used for duplicating work, and means for determining at will the depth of notch cut by said cutter when said machine is used to cut said key blank by code, said limiting means including a stop member and a member having portions of different thickness, said two members being interposed one after the other between said master-key-holding means and said frame, and means movably holding said second-mentioned member to permit any selected portion to be related to said stop member.

In testimony whereof, I have signed my name to this specification this 16th day of March, 1928.

HERMAN HANSEN.

CERTIFICATE OF CORRECTION.

Patent No. 1,889,461.  November 29, 1932.

HERMAN HANSEN.

It is hereby certified that error appears in the printed specification of the above numbered patent requiring correction as follows: Page 1, line 64, for "sudface" read "surface"; page 5, line 123, claim 4, and page 6, lines 43, 69 and 95, claims 6, 7 and 8, respectively, strike out the word "rotary"; page 6, lines 22, 23 and 24, claim 5, strike out the words and comma "additional holding means relatively fixedly mounted with respect to said first-mentioned holding means,", and insert the same to follow "cutter," in line 22; and that the said Letters Patent should be read with these corrections therein that the same may conform to the record of the case in the Patent Office.

Signed and sealed this 28th day of February, A. D. 1933.

(Seal)

M. J. Moore,
Acting Commissioner of Patents.